(12) United States Patent
Bissell et al.

(10) Patent No.: US 11,188,837 B2
(45) Date of Patent: Nov. 30, 2021

(54) DYNAMIC FIELD ENTRY PERMUTATION SEQUENCE GUIDANCE BASED ON HISTORICAL DATA ANALYSIS

(71) Applicant: International Business Machines Corporation, Armonk, NY (US)

(72) Inventors: Brian E. Bissell, Fairfield, CT (US); Joseph L. Sharpe, III, Waxhaw, NC (US); Kristi Farinelli, Philadelphia, PA (US); Stefan Van Der Stockt, Austin, TX (US); Manali Jairam Chanchlani, Jersey City, NJ (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 16/265,507

(22) Filed: Feb. 1, 2019

(65) Prior Publication Data

US 2020/0250550 A1 Aug. 6, 2020

(51) Int. Cl.
*G06F 40/00* (2020.01)
*G06N 5/04* (2006.01)
*G06F 3/0481* (2013.01)
*G06N 20/00* (2019.01)
*G06F 40/174* (2020.01)

(52) U.S. Cl.
CPC ............. *G06N 5/04* (2013.01); *G06F 3/0481* (2013.01); *G06F 40/174* (2020.01); *G06N 20/00* (2019.01)

(58) Field of Classification Search
CPC .............................. G06F 40/174; G06F 3/0481
See application file for complete search history.

(56) References Cited

U.S. PATENT DOCUMENTS

| | | | |
|---|---|---|---|
| 4,899,276 A | * | 2/1990 | Stadler ................... G06F 9/453 715/705 |
| 6,202,052 B1 | | 3/2001 | Miller |
| 6,697,056 B1 | | 2/2004 | Bergelson et al. |
| 7,254,569 B2 | | 8/2007 | Goodman et al. |
| 7,426,496 B2 | | 9/2008 | Kristjansson |
| 7,890,442 B2 | | 2/2011 | Weir et al. |
| 8,126,787 B1 | | 2/2012 | Leek et al. |
| 8,635,127 B1 | | 1/2014 | Shaw |

(Continued)

OTHER PUBLICATIONS

Complete guide to Association Rules, retrieved from https://towardsdatascience.com/association-rules-2-aa9a77241654, by Anisa Garg, 8 pages Sep. 3, 2018. (Year: 2018).*

(Continued)

*Primary Examiner* — Scott T Baderman
*Assistant Examiner* — Barbara M Level
(74) *Attorney, Agent, or Firm* — VanLeeuwen & VanLeeuwen; David K. Mattheis (57) ABSTRACT

An approach is provided in which an information handling system analyzes a set of historical form data corresponding to a set of completed forms. The set of historical form data includes information indicating a historical order at which a set of fields were completed in the set of completed forms. Next, the information handling system determines, based on the set of historical form data, a current order at which to complete a set of incomplete fields included in a current form. In turn, the information handling system displays the current form and a user interface on a display that indicates the current order at which to complete the incomplete fields on the current form.

17 Claims, 8 Drawing Sheets

(56) References Cited

U.S. PATENT DOCUMENTS

| | | | |
|---|---|---|---|
| 10,503,367 B2* | 12/2019 | Rodgers | G06F 3/0482 |
| 2009/0204881 A1 | 8/2009 | Murthy et al. | |
| 2011/0131479 A1* | 6/2011 | Padgett | G06F 3/0481 |
| | | | 715/223 |
| 2011/0214067 A1* | 9/2011 | Tanaka | G06F 3/0481 |
| | | | 715/745 |
| 2011/0282815 A1* | 11/2011 | Thomas | G06N 5/025 |
| | | | 706/12 |
| 2014/0029046 A1 | 1/2014 | Ponnavaikko et al. | |
| 2014/0201102 A1 | 7/2014 | Srinivasan et al. | |
| 2015/0254225 A1* | 9/2015 | Chirca | G06F 40/174 |
| | | | 715/224 |
| 2015/0319198 A1 | 11/2015 | Gupta et al. | |
| 2017/0075873 A1* | 3/2017 | Shetty | G06F 3/0481 |
| 2017/0286389 A1* | 10/2017 | Ceneviva | G06F 40/186 |
| 2018/0174243 A1* | 6/2018 | Mishra | G06F 40/174 |
| 2019/0138585 A1* | 5/2019 | Jain | G06F 40/134 |

OTHER PUBLICATIONS

Miller, "SeamlessDocs: The Automation Platform Helping State and Local Governments Go Paperless," Forbes, Nov. 2017, 5 pages.
Deshpande et al., "Item-Based Top-N Recommendation Algorithms," ACM Transactions on Information System, vol. 22, No. 1, Jan. 2004, pp. 143-177.

\* cited by examiner

User Interface View 310

1) Complete demographic fields first

2) Complete filing status

3) Complete exemptions next

4) Complete these fields in any order

5) Complete field 21

6) Complete field 22

7) Proceed through additional form fields

DYNAMIC FIELD ENTRY PERMUTATION SEQUENCE GUIDANCE BASED ON HISTORICAL DATA ANALYSIS

BACKGROUND

Communicating and transacting business on the Internet has become a daily experience for users. Internet users are commonly asked to complete numerous forms to purchase products, request information, or submit questions. Some forms are relatively simple, while other forms are complex and are dependent upon information obtained from other forms, such as an IRS 1040 tax form.

Complex forms are not always best completed in the order in which the form fields are numbered, arranged, or presented to a user. In addition, complex forms typically have many different "paths," or field permutation sequences ("click-streams"), which a user follows to navigate and complete the form. For example, numerous permutation sequences are possible when a user completes an IRS 1040 tax form that includes several dependent forms, such as a Schedule A Itemized Deductions form, a Schedule C Profit/Loss form, a Schedule D Capital Gains/Loss form, and etcetera.

The explosive growth of the Internet and the emergence of e-commerce have led to the development of recommender systems that use personalized information filtering technology to identify a set of items that are of interest to a user. Current recommendation systems guide users through a form by recommending which field a user should complete based on fields that the user has already completed. Although these recommendation systems recommend the next field based on similarities, they do not account for the order at which fields are historically completed.

BRIEF SUMMARY

According to one embodiment of the present disclosure, an approach is provided in which an information handling system analyzes a set of historical form data corresponding to a set of completed forms. The set of historical form data includes information indicating a historical order at which a set of fields were completed in the set of completed forms. Next, the information handling system determines, based on the set of historical form data, a current order at which to complete a set of incomplete fields included in a current form. In turn, the information handling system displays the current form and a user interface on a display that indicates the current order at which to complete the incomplete fields on the current form.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
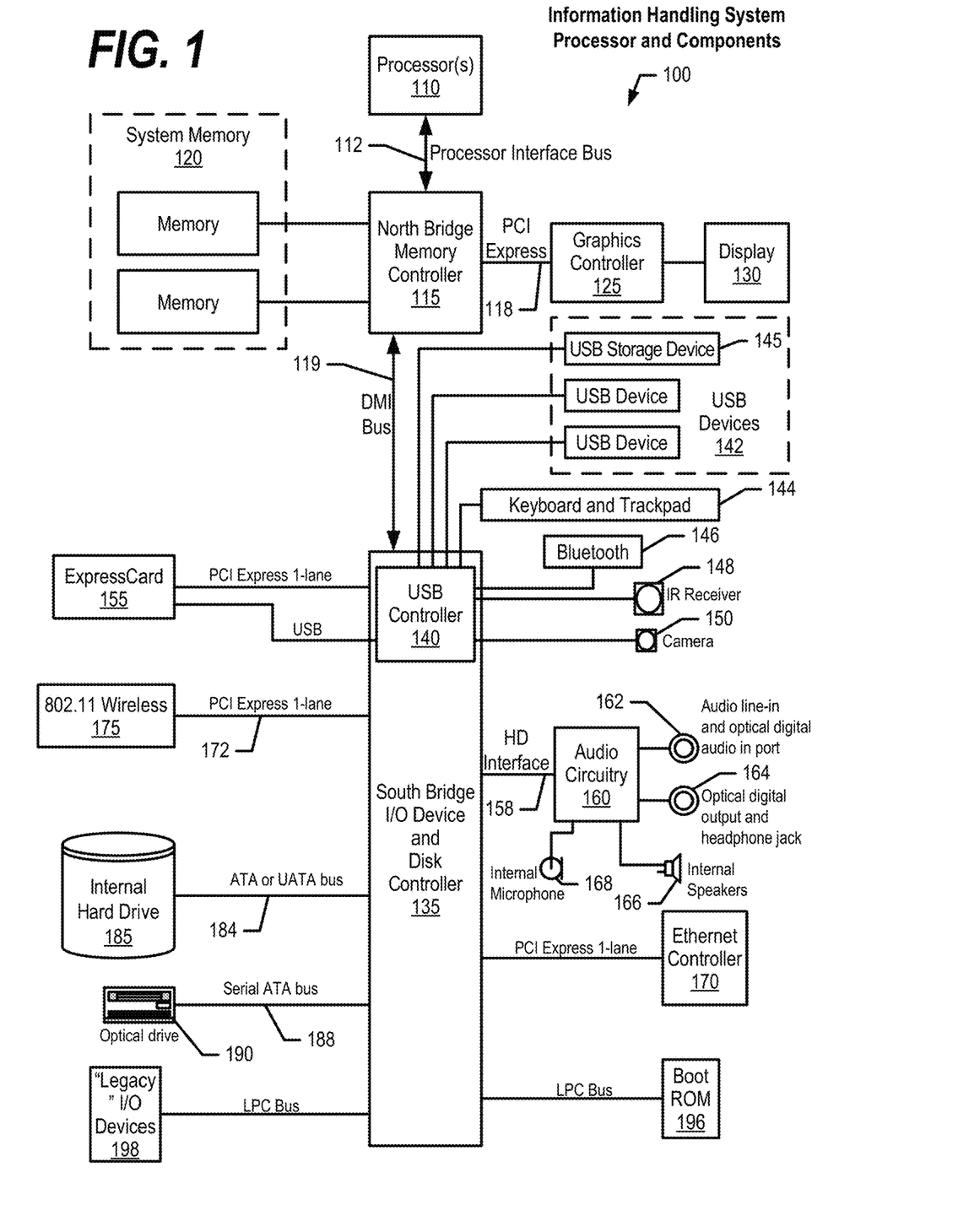
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
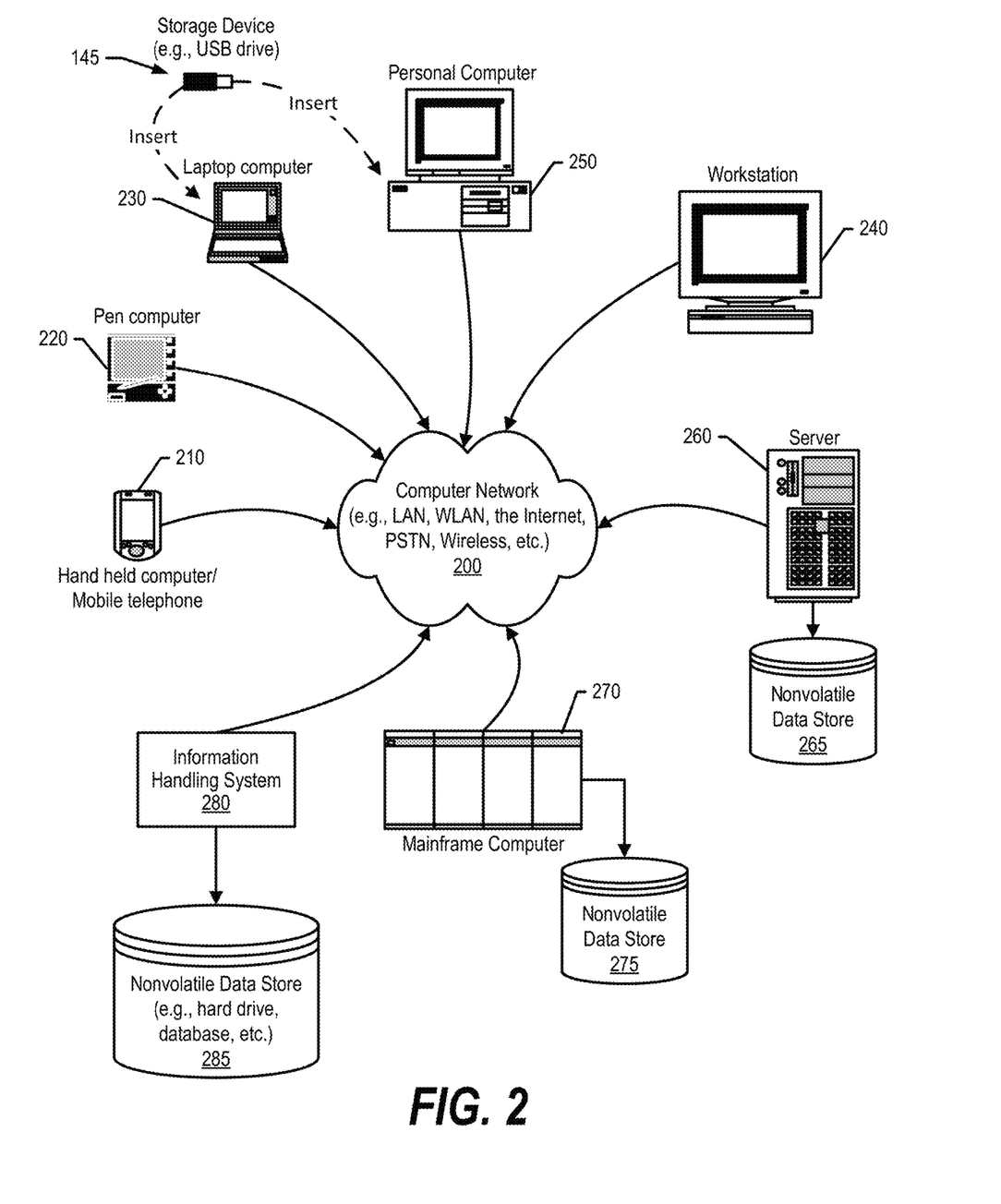
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, today's recommendation systems do not dynamically guide a user through completing a complex form based on historical data analysis. FIGS. 3 through 8 depict an approach implemented by an information handling system that analyzes historical form data and provides dynamic field sequence progression guidance to a user that is in process of completing a current form. The information handling system discussed herein overlays a personalized recommendation completion order on top of a current form based on observing historical data entry patterns from real-world examples of previously completed forms from other users. In addition, the information handling system uses statistically known permutation sequences that are known beforehand or deduced using natural language process analysis.

In one embodiment, the information handling system evaluates a number of other users that have prepared a similar form. The evaluation includes learning the most applicable fields, learning which fields are completed together, and learning the users' field entry permutation sequence to complete the form. The information handling system learns both the most applicable fields as well as the best sequence to fill out a form's fields. In turn, the information handling system then provides guidance to a user completing a current form in real-time on a field by field basis (field type) or on a field group (section) basis ("batch").

In one embodiment, the information handling system deploys an application program interface (API) that provides step-by-step field entry permutation sequence instructions to the user to complete the form (by field type or field groups). In another embodiment, the information handling system deploys a batch system that allows a user to "double check" the forms they (partially or wholly) completed and compare their completed form to their peers' completed forms, possibly identifying additional required fields the user has missed.

Figure 3:
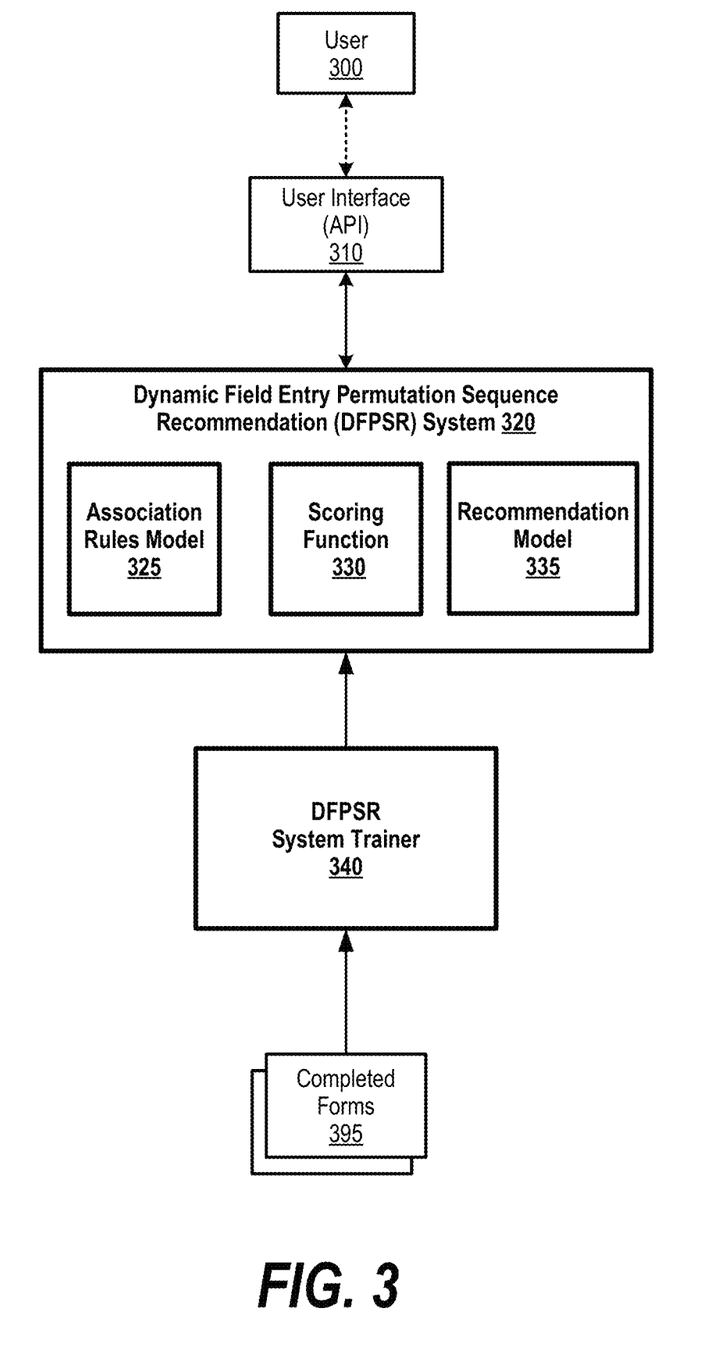
FIG. 3 is an exemplary diagram depicting a dynamic field entry permutation sequence recommendation system providing field entry permutation sequence recommendations to a user based on historical data analysis.

FIG. 3 is an exemplary diagram depicting a dynamic field entry permutation sequence recommendation system providing field entry permutation sequence recommendations to a user based on historical data analysis. As discussed in detail below, dynamic field entry permutation sequence recommendation (DFPSR) system 320 uses DFPSR system trainer 340 to train association rules model 325, scoring function 330, and recommendation model 335. Once trained, dynamic field entry permutation sequence recommendation system 320 interfaces with user 300 through user interface API 310 to assist user 300 to complete a complex form.

During training, DFPSR system trainer 340 prepares previously completed forms 395 by forming field data and applying an item-item collaboration filter recommendation engine to USER and FIELD columns to learn which fields are associated with each other. Next, dynamic field entry permutation sequence recommendation system trainer 340 trains association rules model 325 using FIELD and SEQUENCE columns to learn/induce rules that relate one or more antecedent fields with relevant consequent fields, such as a user needs to complete field A before completing field B (see FIG. 6 and corresponding text for further details).

In one embodiment, association rules model 325 identifies relationships between field data over time. The output is a set of multiple rules that describe these relationships, such as an IF (antecedents) THEN (consequents) format. In this embodiment, dynamic field entry permutation sequence recommendation system trainer 340 trains association rules model 325 to find those association rules that describe which fields need to be completed first (antecedents) before a different field is completed (consequent).

During runtime, dynamic field entry permutation sequence recommendation system 320 receives user input via user interface 310 and evaluates which fields are completed on a current from displayed to user 300. Dynamic field entry permutation sequence recommendation system 320 evaluates the completed fields and 1) applies the recommender system to propose the top N related fields and 2) uses the association rules to reorder the N fields into the correct sequence.

Scoring function 330 joins association rules model 325 and recommendation model 335 to form a system that recommends which fields user 300 should complete next, as well as the order in which they should be completed. In one embodiment, scoring function 330 performs three tasks each time it is invoked. First, scoring function 330 determines the current state of the form (completed fields, incomplete fields) and creates an input vector of zeroes and ones that correspond to which fields have been completed. For example, for fields [F1, F2, . . . , FM] for M fields, scoring function 330 generates a vector [0, 1, 0, 1, . . . , 0] that serves as a list of flags indicating which fields have been completed (filled out). Second, scoring function 330 passes the input vector to recommendation model 335, which determines N recommended fields to complete next based on the input vector.

In one embodiment, recommendation model 335 uses the current state of the form (i.e. binary vector of which fields have been filled out) and proposes up to N fields that the user should fill out next. For example, N could be 1 (field by field) but in many cases N could be N=5 or N=10 or more. In this embodiment, recommendation model 335 uses a known algorithm "Item-to-item collaborative filtering" to learn the links between items based on the examples from prior historical forms (e.g., "people who filled this out also filled that out"). In this embodiment, association rules model 325 proposes the order in which the N fields should be filled out.

Scoring function 330 then passes the N recommended fields to association rules model 325, which identifies rules corresponding to N recommended fields as consequents. For example, the N recommended fields are field x, field y, and field z, and association rule A includes "field c" as an antecedent field and "field z" as a consequent field. In this example, scoring function 330 identifies association rule A as having a consequent field corresponding to one of the N recommended fields.

For each identified rule, scoring function 330 identifies its corresponding antecedent fields and records the antecedents in a unioned set. Using the example discussed above, scoring function identifies "field c" as an antecedent field in association rule A. For each of the antecedent fields, scoring function 330 determines whether the antecedent fields have been completed based on the input vector that identifies completed/incomplete fields. For the antecedent fields that have not yet been completed, scoring function 330 determines whether they are included in the N recommended fields. If so, scoring function 330 recommends to user 300 that these fields be completed next (see FIG. 8 and corresponding text for further details).

In one embodiment, when dynamic field entry permutation sequence recommendation system 320 fails to recommend a particular field, such as a newly added and unique field, dynamic field entry permutation sequence recommendation system 320 adds an additional recommendation that association rules model 325 detected but recommendation model 335 missed.

Figure 4:
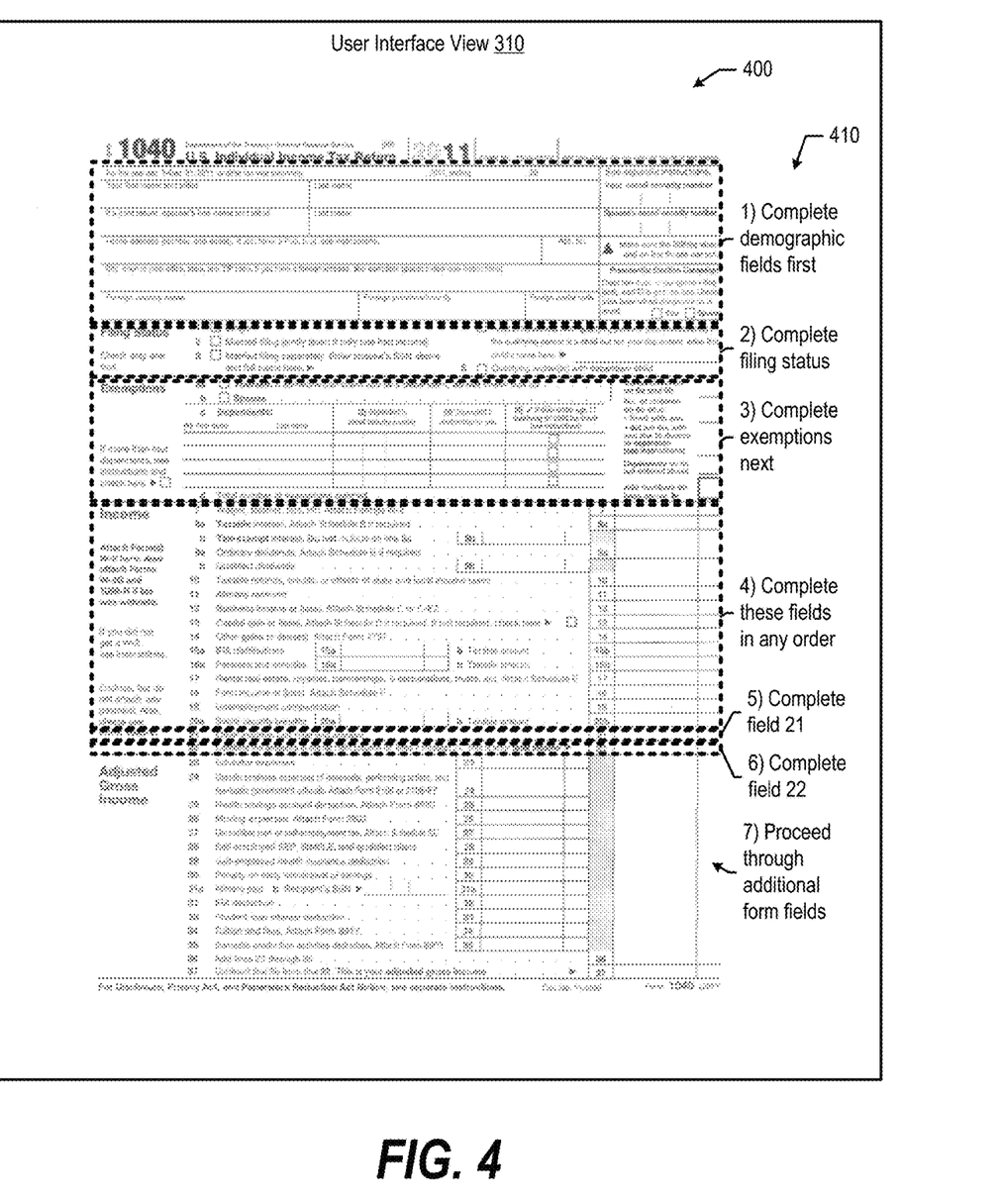
FIG. 4 is an exemplary diagram depicting a form and a field entry permutation sequence recommendation overlay.

FIG. 4 is an exemplary diagram depicting a form and a field entry permutation sequence recommendation overlay. User interface view 310 includes IRS 1040 tax form 400 and field entry permutation sequence recommendations 410. Each of field entry permutation sequence recommendations 410 points to a text block that overlays on form 400. the embodiment shown in FIG. 4 provides field entry permutation sequence recommendations on a field group basis. As discussed herein, dynamic field permutation sequence recommendation system 320 also provides field entry permutation sequence recommendations on a field by field basis.

Figure 5:
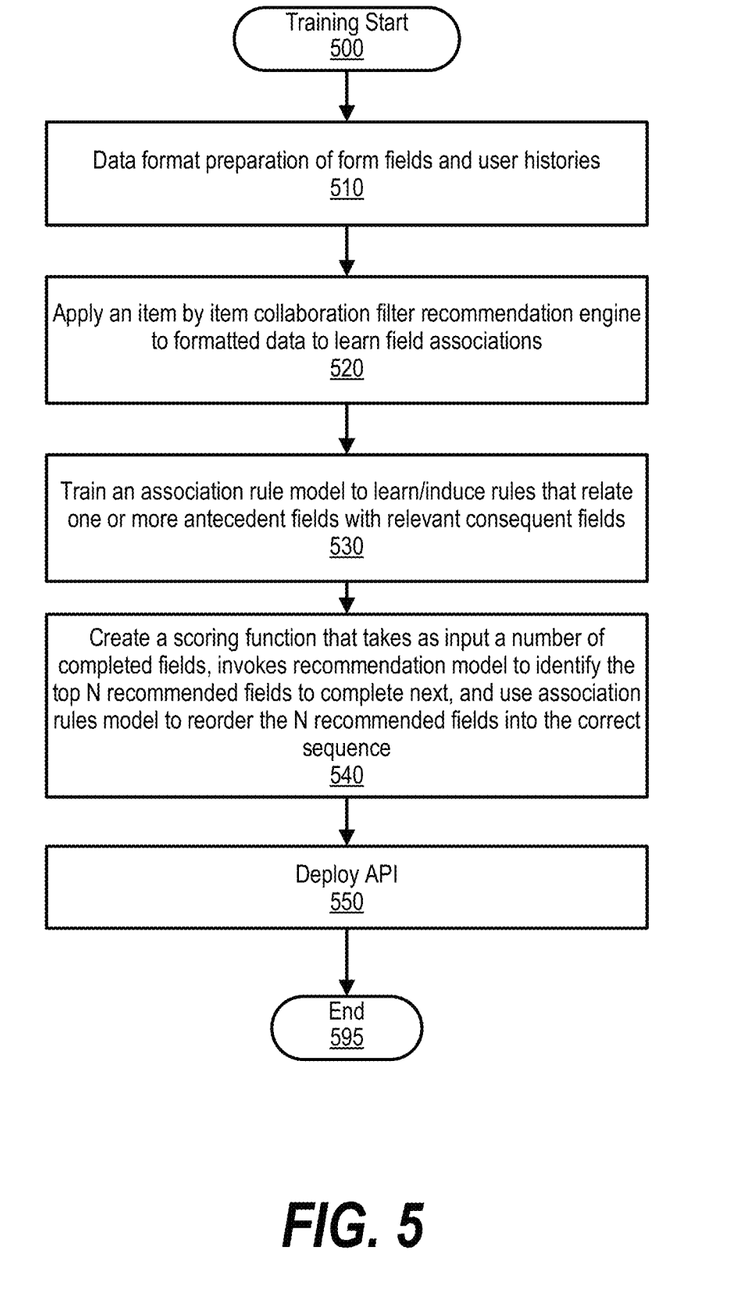
FIG. 5 is an exemplary flowchart showing steps taken to train a dynamic field entry permutation sequence recommendation system.

FIG. 5 is an exemplary flowchart showing steps taken to train dynamic field entry permutation sequence recommendation system 320. FIG. 5 processing commences at 500 whereupon, at step 510, the process formats completed form fields and user histories (see FIG. 6, reference numeral 610 and corresponding text for further details). At step 520, the process applies an item by item collaboration filter recommendation engine to formatted data to learn field associations. In one embodiment, learning occurs at any point during operation and the scoring function unites antecedents/consequents. At step 530, the process trains association rule model 325 to learn/induce rules that relate the antecedent fields with relevant consequent fields.

Figure 6:
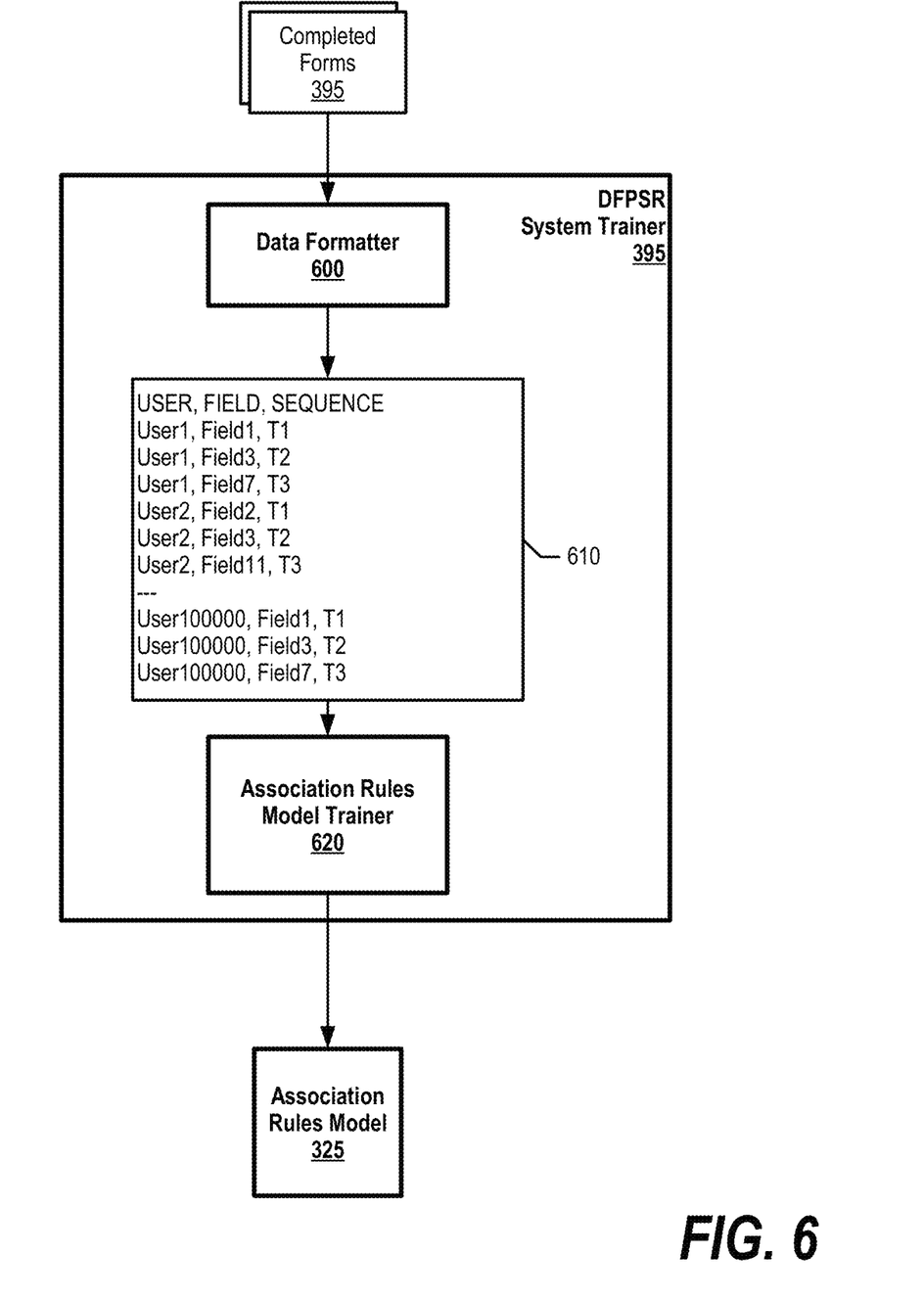
FIG. 6 is an exemplary diagram depicting historical form data being transformed into association rules upon which an association rules model is trained.
Figure 8:
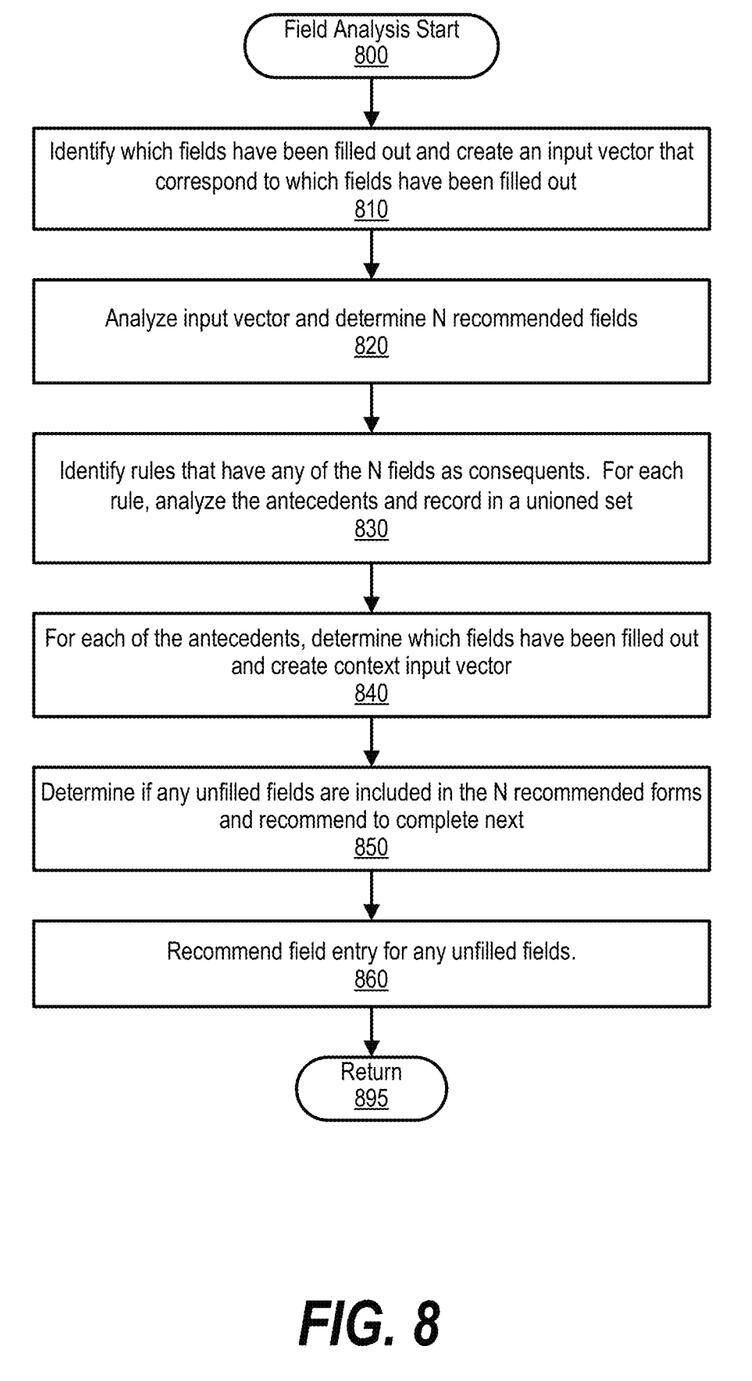
FIG. 8 is an exemplary flowchart showing steps taken to analyze user input and recommend next fields to complete.

At step 540, the process creates scoring function 330 that takes as input a number of completed fields, invokes recommendation model 335 to identify the top N recommended fields to complete next, and use association rules model 325 to reorder the N recommended fields into the correct sequence (see FIG. 8 and corresponding text for further details). At step 550, the process deploys the API, and FIG. 5 processing thereafter ends at 595. FIG. 6 is an exemplary diagram depicting historical form data being transformed into association rules upon which association rules model 325 is trained. Data formatter 600 retrieves completed forms 395 and performs parsing/formatting steps to capture data in a format shown in data 610. In one embodiment, using a spreadsheet configuration, data formatter 600 creates a field ID dictionary (columns) for every possible field. This includes historical data on which fields users filled out the form fields, such as "a row per user in the spreadsheet", with a value in every "column" the user filled out. In this embodiment, the value in each filled out "column" is an integer to indicate the sequence in which the user filled the form. In one embodiment, certain events can have the same sequence id, indicating that they have the same priority in time (e.g., order of first name and last name not applicable). In turn, data formatter 600 generates data 610.

Association rules model trainer 620 receives formatted data and trains an item-item collaborative filter using the USER and FIELD columns using algorithms such as k-similarity normalization & conditional probability similarity. In one embodiment, association rules model trainer 620 determines a similarity cut-off threshold that optimizes the recommendations across users.

Association rules model trainer 620 then trains association rules model 325 to learn the relationship in time between fields. This includes using columns FIELD and SEQUENCE and any rule induction algorithm such as APRIORI or CARMA (SPSS) or any similar techniques. The output is a set of association rules that relate antecedent fields to consequent fields, together with rule confidence and rule support. As defined herein, rule support is a number of examples in data 610 that show the pattern. Rule confidence is the percentage of examples in data 610 that follow the rule, where a high confidence value is more important than a high support value. The result is association rules model 325 that stipulates which fields are required inputs before another field can be completed.

Figure 7:
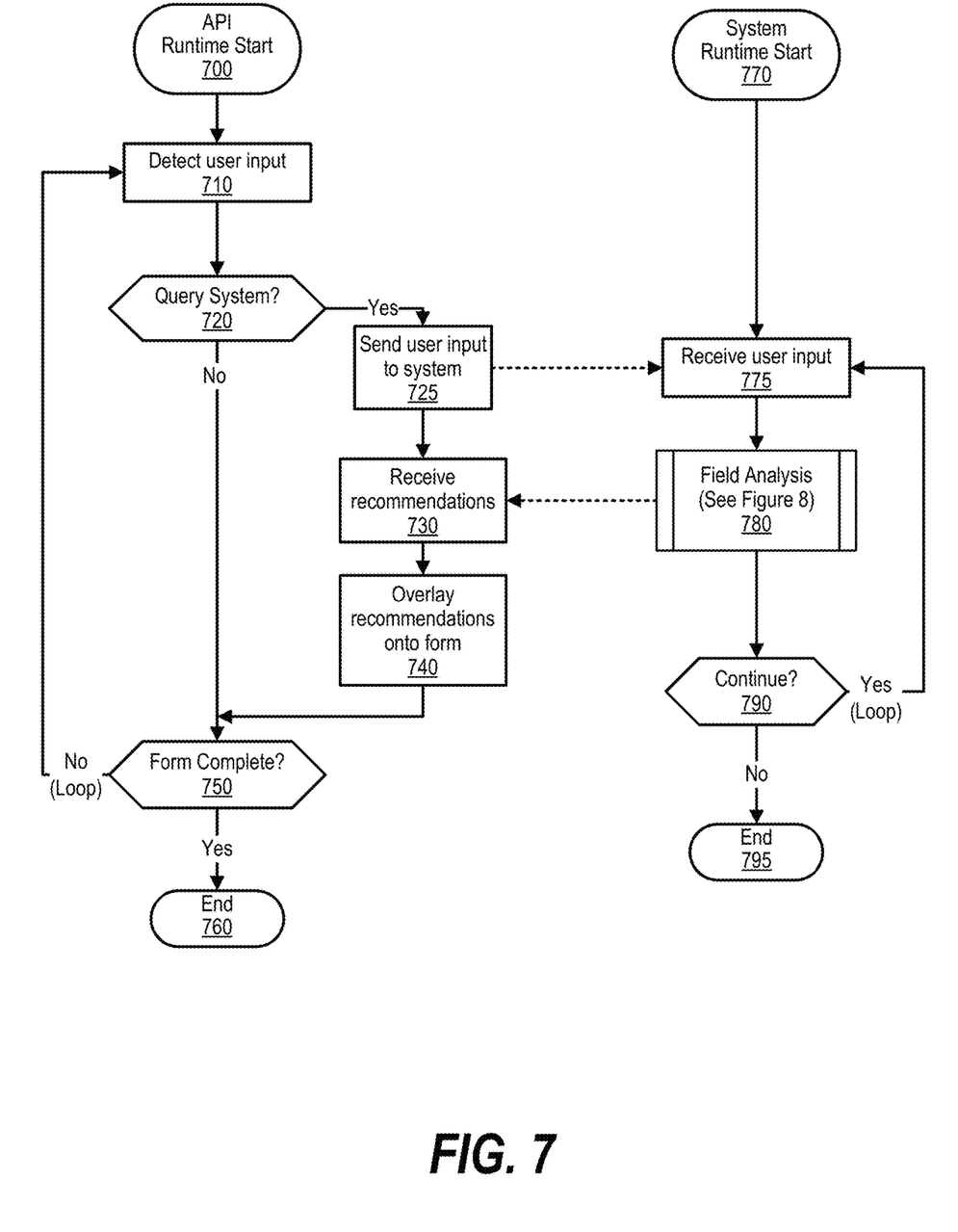
FIG. 7 is an exemplary flowchart showing steps taken to dynamically provide field entry permutation sequence recommendations to a user.

FIG. 7 is an exemplary flowchart showing steps taken to dynamically provide field entry permutation sequence recommendations to a user. FIG. 7 API processing commences at 700 whereupon, at step 710, the process detects a user input. The process determines as to whether to query dynamic field entry permutation sequence recommendation system 320 (decision 720). In one embodiment, the API is configured to query dynamic field permutation sequence recommendation system 320 each time that user 300 inputs data. In another embodiment, the API is configured to query dynamic field permutation sequence recommendation system 320 when user 300 completes fields in a section on a form.

If the API should query dynamic field entry permutation sequence recommendation system 320, then decision 720 branches to the 'yes' branch whereupon, at step 725, the process sends the user input to dynamic field entry permutation sequence recommendation system 320. At step 730, the process receives recommendations from dynamic field entry permutation sequence recommendation system 320 and, at step 740, the process overlays the recommendations onto the form (see FIG. 4 and corresponding text for further details). On the other hand, if the API process should not query dynamic field entry permutation sequence recommendation system 320, then decision 720 branches to the 'no' branch bypassing steps 725 through 740.

The process determines as to whether the user completes the form (decision 750). If the user has not completed the form, then decision 750 branches to the 'no' branch which loops back to detect and process more user input. This looping continues until the user completes the form, at which point decision 750 branches to the 'no' branch exiting the loop. FIG. 7 API processing thereafter ends at 760.

FIG. 7 dynamic field entry permutation sequence recommendation system processing commences at 770 whereupon, at step 775, the process receives the user input. At predefined process 780, the process analyzes completed fields and provides field entry permutation sequence recommendations accordingly (see FIG. 8 and corresponding text for processing details).

The process determines as to whether to continue (decision 790). If the process should continue, then decision 790 branches to the 'yes' branch which loops back to receive more user input. This looping continues until the process should terminate, such as when user 300 completes the form, at which point decision 790 branches to the 'no' branch exiting the loop. FIG. 7 processing thereafter ends at 795.

FIG. 8 is an exemplary flowchart showing steps taken to analyze user input and recommend next fields to complete. FIG. 8 processing commences at 800 whereupon, at step 810, the process identifies which fields have been completed and creates a corresponding input vector. For example, for fields [F1, F2, . . . , FM] for M fields, the process generates a vector [0, 1, 0, 1, . . . , 0] that serves as a list of flags indicating which fields have been completed (filled out).

At step 820, the process analyzes the input vector and determines N recommended fields to complete next. At step 830, the process identifies rules that have any of the N fields as consequents as discussed above. For each rule, the process analyzes the antecedent fields and records the antecedent fields in a unioned set.

At step 840, for each of the antecedent fields, the process determines which fields have been completed and creates a context input vector. For example, when a user is completing a set of tax forms, the process creates a context input vector based on which fields across all forms that user has already filled out to the current point in time. This context input vector consists of 0 if the field is blank and 1 if the field includes a value (such as text, a drop-down value, a tick, etc.). The context input vector of length M is a serialized representation of the all the fields across the entire set of forms (one or more forms). In one embodiment, the context input vector is a row in a database as an analogy.

At step 850, the process determines if any incomplete fields are included in the N recommended fields and uses the information to generate field entry permutation sequence recommendations to user 300. Continuing with the example above, the context input vector is input to recommendation model 335 and, based on the elements in the context input vector that have a value of 1, recommendation model 335 recommends up to N fields that the process determines the user should fill out next based upon what the recommendation model 335 has learned from the historical data. At this point, the process informs the user which N fields should be filled out next. In one embodiment, the process uses association rules model 325 to permute the top N recommended fields to form a logical order of completing the fields. In this embodiment, association rules are also learned from the historical data.

In one embodiment, association rules model 325 captures the required fields that are required to be completed prior to other given fields. For each of the top N fields returned by recommendation model 335, association rules model 325 determines which fields needs to be completed first.

At step 860, adds field entry recommendations for any other unfilled fields to field entry permutation sequence recommendations. For example, when association rules model 325 identifies a particular field that is required to be filled out that is not a part of the top N results, association rules model 325 adds the identified field to the top N results. FIG. 8 processing thereafter returns to the calling routine (see FIG. 7) at 895.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
analyzing a set of historical form data corresponding to a set of completed forms, wherein the set of historical form data comprises information indicating a historical order at which a set of fields were completed in the set of completed forms;
organizing a set of incomplete fields in a current form into a plurality of incomplete field groups based on the analyzing of the set of historical form data, wherein each one of the plurality of incomplete field groups comprises a plurality of incomplete fields from the set of incomplete fields;
determining, based on the set of historical form data, a current order at which to complete the plurality of incomplete field groups; and
displaying the current form and a user interface overlay on a display, wherein the user interface overlay indicates the current order at which to complete each one of the plurality of incomplete field groups on the current form.

2. The method of claim 1 wherein the analyzing further comprises training an association rules model, the method further comprising:
identifying, from the set of fields based on the historical order, one or more antecedent fields and one or more consequent fields, wherein the one or more antecedent fields were completed prior to the one or more consequent fields on the set of completed forms;
generating a set of association rules based on the identified one or more antecedent fields and the one or more consequent fields; and
training the association rules model based on the set of association rules.

3. The method of claim 2 further comprising:
creating a scoring function that scores the set of incomplete fields based on the set of association rules and a set of completed fields on the current form that the user completes.

4. The method of claim 3 further comprising:
generating an input vector based on the set of completed fields on the current form;
determining one or more recommended fields to complete based on the input vector;
identifying one or more of the set of association rules indicating at least one of the one or more recommended fields as consequent fields;
retrieving one or more of the antecedent fields from the identified one or more association rules;
selecting a subset of the set of incomplete fields that match the one or more antecedent fields; and
recommending the subset of incomplete fields to complete next on the user interface.

5. The method of claim 1 further comprising:
receiving user input comprising a data entry that completes at least one of the set of incomplete fields in at least one of the plurality of incomplete field groups;
dynamically determining, based on the user input, a revised order at which to complete a revised plurality of incomplete field groups included in the current form; and
dynamically modifying the user interface to indicate the revised order at which to complete the revised plurality of incomplete field groups.

6. The method of claim 1 further comprising:
determining a current form type corresponding to the current form; and
utilizing a subset of the historical form data to determine the order at which to complete the plurality of incomplete field groups included in the current form, wherein the subset of historical form data corresponds to a subset of the completed forms that match the form type.

7. An information handling system comprising:
one or more processors;
a memory coupled to at least one of the processors;
a set of computer program instructions stored in the memory and executed by at least one of the processors in order to perform actions of:
analyzing a set of historical form data corresponding to a set of completed forms, wherein the set of historical form data comprises information indicating a historical order at which a set of fields were completed in the set of completed forms;
organizing a set of incomplete fields in a current form into a plurality of incomplete field groups based on the analyzing of the set of historical form data, wherein each one of the plurality of incomplete field groups comprises a plurality of incomplete fields from the set of incomplete fields;

determining, based on the set of historical form data, a current order at which to complete the plurality of incomplete field groups; and displaying the current form and a user interface overlay on a display, wherein the user interface overlay indicates the current order at which to complete each one of the plurality of incomplete field groups on the current form.

8. The information handling system of claim 7 wherein the processors perform additional actions comprising:

identifying, from the set of fields based on the historical order, one or more antecedent fields and one or more consequent fields, wherein the one or more antecedent fields were completed prior to the one or more consequent fields on the set of completed forms;

generating a set of association rules based on the identified one or more antecedent fields and the one or more consequent fields; and training an association rules model based on the set of association rules.

9. The information handling system of claim 8 wherein the processors perform additional actions comprising:

creating a scoring function that scores the set of incomplete fields based on the set of association rules and a set of completed fields on the current form that the user completes.

10. The information handling system of claim 9 wherein the processors perform additional actions comprising:

generating an input vector based on the set of completed fields on the current form;

determining one or more recommended fields to complete based on the input vector;

identifying one or more of the set of association rules indicating at least one of the one or more recommended fields as consequent fields;

retrieving one or more of the antecedent fields from the identified one or more association rules;

selecting a subset of the set of incomplete fields that match the one or more antecedent fields; and recommending the subset of incomplete fields to complete next on the user interface.

11. The information handling system of claim 7 wherein the processors perform additional actions comprising:

receiving user input comprising a data entry that completes at least one of the set of incomplete fields in at least one of the plurality of incomplete field groups;

dynamically determining, based on the user input, a revised order at which to complete a revised plurality of incomplete field groups included in the current form; and dynamically modifying the user interface to indicate the revised order at which to complete the revised plurality of incomplete field groups.

12. The information handling system of claim 7 wherein the processors perform additional actions comprising:

determining a current form type corresponding to the current form; and utilizing a subset of the historical form data to determine the order at which to complete the plurality of incomplete field groups included in the current form, wherein the subset of historical form data corresponds to a subset of the completed forms that match the form type.

13. A computer program product stored in a computer readable storage medium, comprising computer program code that, when executed by an information handling system, causes the information handling system to perform actions comprising:

analyzing a set of historical form data corresponding to a set of completed forms, wherein the set of historical form data comprises information indicating a historical order at which a set of fields were completed in the set of completed forms;

organizing a set of incomplete fields in a current form into a plurality of incomplete field groups based on the analyzing of the set of historical form data, wherein each one of the plurality of incomplete field groups comprises a plurality of incomplete fields from the set of incomplete fields;

determining, based on the set of historical form data, a current order at which to complete the plurality of incomplete field groups; and displaying the current form and a user interface overlay on a display, wherein the user interface overlay indicates the current order at which to complete each one of the plurality of incomplete field groups on the current form.

14. The computer program product of claim 13 wherein the information handling system performs further actions comprising:

identifying, from the set of fields based on the historical order, one or more antecedent fields and one or more consequent fields, wherein the one or more antecedent fields were completed prior to the one or more consequent fields on the set of completed forms;

generating a set of association rules based on the identified one or more antecedent fields and the one or more consequent fields; and training an association rules model based on the set of association rules.

15. The computer program product of claim 14 wherein the information handling system performs further actions comprising:

creating a scoring function that scores the set of incomplete fields based on the set of association rules and a set of completed fields on the current form that the user completes.

16. The computer program product of claim 15 wherein the information handling system performs further actions comprising:

generating an input vector based on the set of completed fields on the current form;

determining one or more recommended fields to complete based on the input vector;

identifying one or more of the set of association rules indicating at least one of the one or more recommended fields as consequent fields;

retrieving one or more of the antecedent fields from the identified one or more association rules;

selecting a subset of the set of incomplete fields that match the one or more antecedent fields; and recommending the subset of incomplete fields to complete next on the user interface.

17. The computer program product of claim 13 wherein the information handling system performs further actions comprising:

receiving user input comprising a data entry that completes at least one of the set of incomplete fields in at least one of the plurality of incomplete field groups;

dynamically determining, based on the user input, a revised order at which to complete a revised plurality of incomplete field groups included in the current form; and dynamically modifying the user interface to indicate the revised order at which to complete the revised plurality of incomplete field groups.

\* \* \* \* \*